Feb. 2, 1926. 1,571,866
T. H. OPPENHEIM ET AL
CORN HUSKING MACHINE
Filed Sept. 25, 1924  4 Sheets-Sheet 1
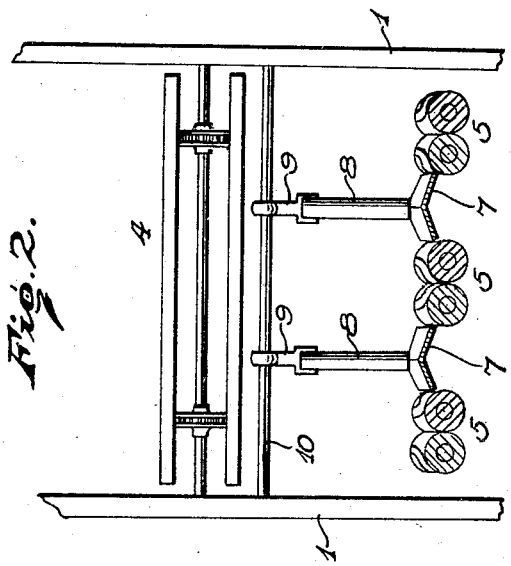
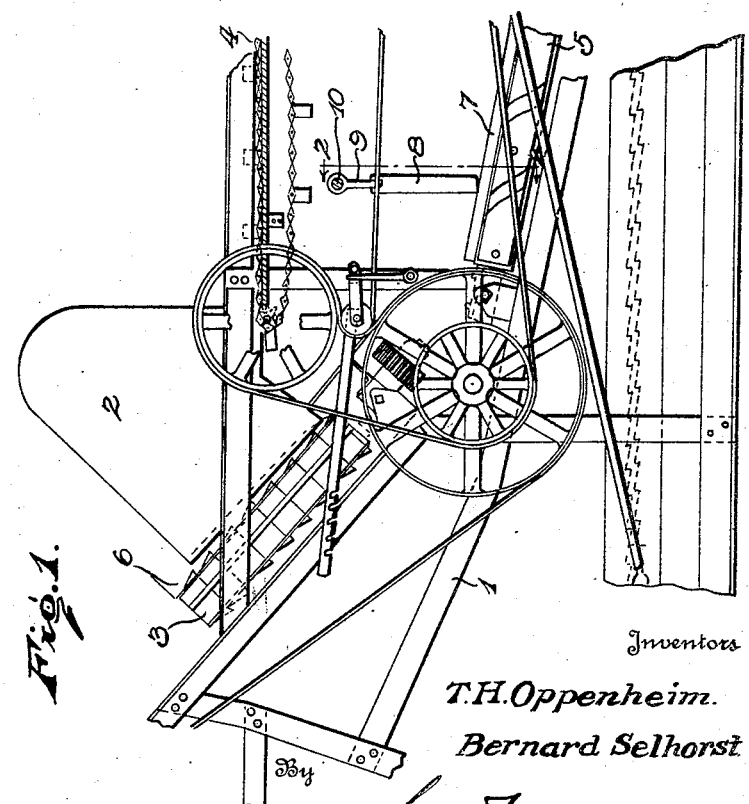
Inventors
T. H. Oppenheim.
Bernard Selhorst
By Lacy & Lacy, Attorneys

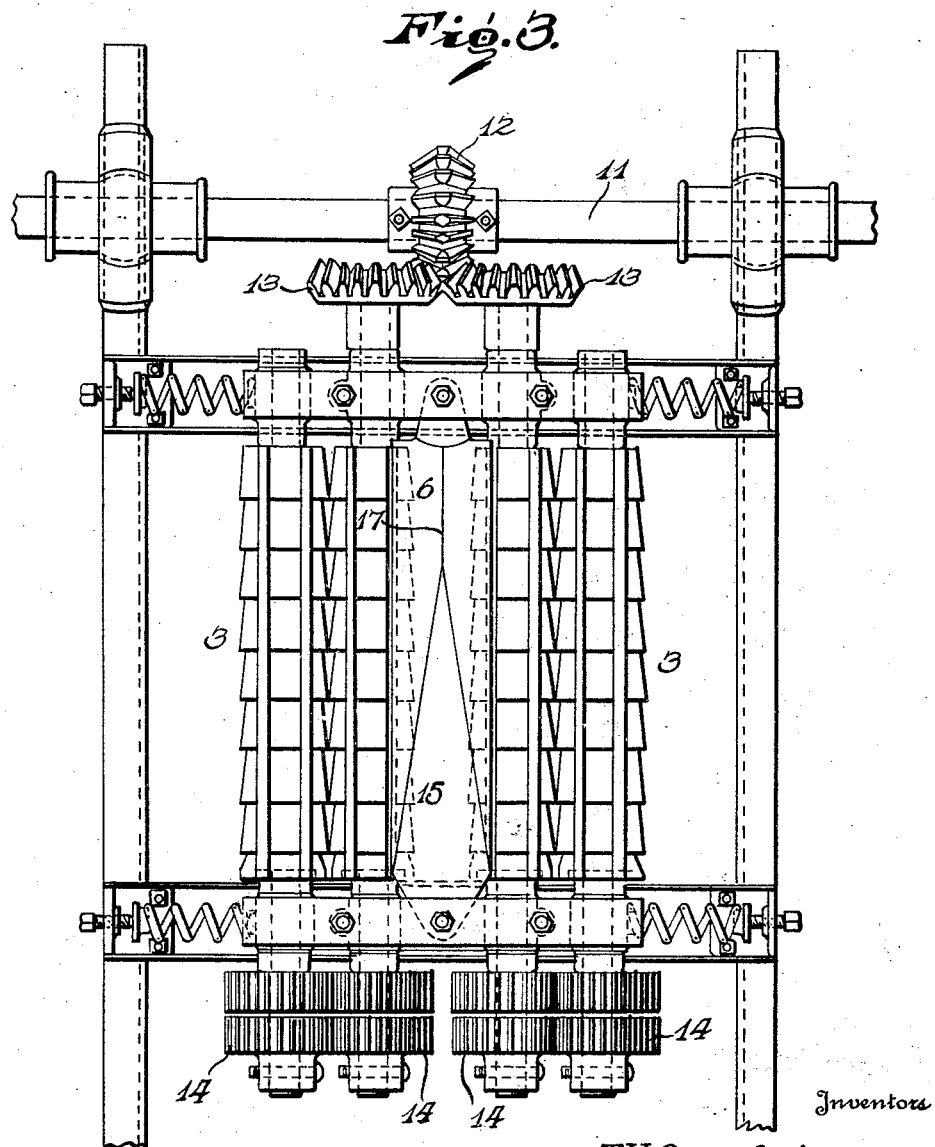

Feb. 2, 1926.

T. H. OPPENHEIM ET AL 1,571,866

CORN HUSKING MACHINE

Filed Sept. 25, 1924     4 Sheets-Sheet 3

Inventors

T. H. Oppenheim.
Bernard Selhorst

By Lacy & Lacy, Attorney

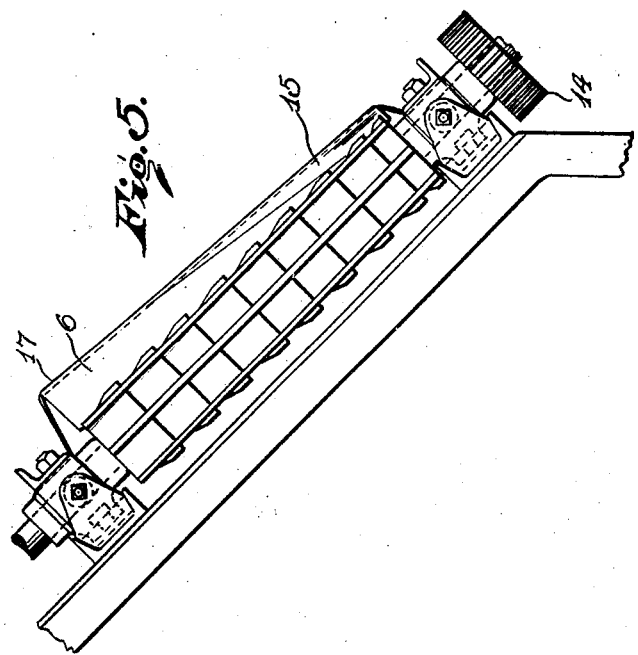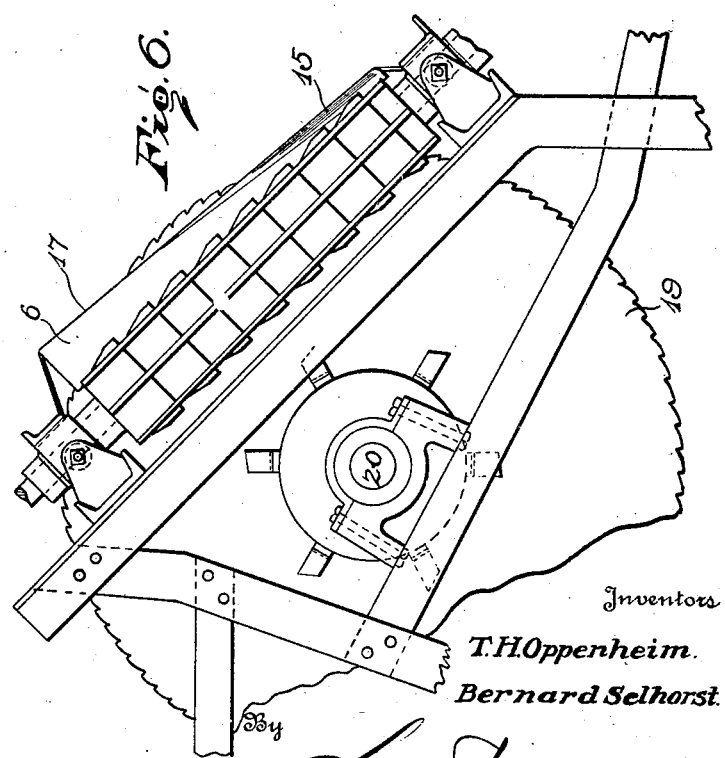

Patented Feb. 2, 1926.

1,571,866

UNITED STATES PATENT OFFICE.

THEODORE H. OPPENHEIM AND BERNARD SELHORST, OF COLDWATER, OHIO, ASSIGNORS TO THE NEW IDEA SPREADER CO., OF COLDWATER, OHIO, A CORPORATION OF OHIO.

CORN-HUSKING MACHINE.

Application filed September 25, 1924. Serial No. 739,863.

*To all whom it may concern:*

Be it known that we, THEODORE H. OPPENHEIM and BERNARD SELHORST, citizens of the United States, residing at Coldwater, in the county of Mercer and State of Ohio, have invented certain new and useful Improvements in Corn-Husking Machines, of which the following is a specification.

This invention relates to corn-husking machines of that type in which the harvested corn stalks with the ears thereon are delivered in bundles to snapping rolls by the action of which the ears of corn are snapped from the stalks, the ears passing then to husking rolls by which the husks are stripped from the ears. The invention has special reference to the feeding of the bundles to and over the snapping rolls, and has for its object the provision of means whereby the stalks will be spread as they are delivered to the snapping rolls so that the strain upon the rolls and the driving mechanism will be evenly distributed and choking of the parts by an accumulation of stalks or ears upon the snapping rolls or at the upper ends of the husking rolls will be avoided. Other incidental objects of the invention will appear in the course of the following description, and the invention resides in certain novel features which will be particularly pointed out in the appended claims.

In the accompanying drawings:

Figure 1 is a side elevation, with parts in section, of a portion of a corn-husking machine embodying one form of our invention;

Fig. 2 is a detail transverse section on the line 2—2 of Fig. 1;

Fig. 3 is an enlarged plan view of the snapping rolls showing one embodiment of our invention in connection therewith;

Fig. 5 is a side elevation thereof;

Fig. 6 is a side elevation showing another embodiment of the invention, and

Figure 4:
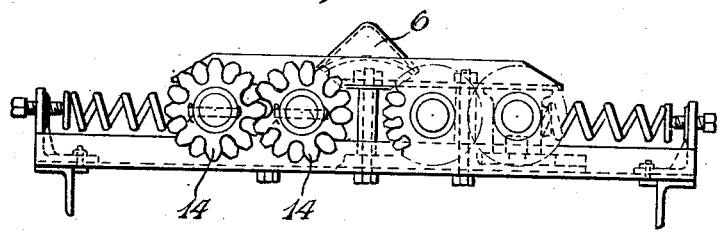
Fig. 4 is a rear end elevation of the same.

Referring more particularly to Figs. 1 and 2, the reference numeral 1 indicates a portion of the frame of a corn-husking machine, and 2 designates a hopper or guiding housing disposed over the snapping rolls 3, while the reference numeral 4 indicates a portion of the feeding table or conveyer whereby the bunches of stalks are delivered to the snapping rolls. The reference numeral 5 indicates a portion of the husking rolls which are arranged below the snapping rolls and in position to receive the ears of corn from the snapping rolls. The snapping rolls and the husking rolls are arranged in pairs, as will be readily understood upon reference to Fig. 2, and as many pairs of either the snapping rolls or the husking rolls may be provided as may be determined by the capacity of the particular machine in which they are installed. Moreover, the particular surface configuration of the rolls is not material to our present invention. In corn-husking machines as now very generally constructed, the snapping rolls are arranged close together without any cooperating bundle dividing or separating elements, and, as a result of this construction, the stalks are not spread or distributed evenly over the snapping rolls and the rolls are brought into such a compact relation that the hopper or guiding casing at the snapping rolls is so narrow that the stalks are crowded and tend to accumulate upon the rolls faster than they can pass through the machine. The construction also leaves very little space between the end of the feeding table or conveyer and the rolls for the passage of the ears of corn to the husking rolls, and the unhusked ears tend to accumulate in said space so as to choke the operation of the machine. In carrying out our present invention, we provide at least two pairs of snapping rolls, as will be readily understood upon reference to Fig. 3, and a dividing bar 6 is arranged across the space between the inner rolls of each pair so that the stalks will be spread and fed to the two pairs of rolls in substantially equal proportions. The husking rolls, of course, are arranged with their receiving ends below and adjacent the lower ends of the snapping rolls, and dividing bars 7 are arranged across the space between the pairs of rolls. The dividing bars 6 and 7, of course, extend longitudinally of the rolls, and they are substantially V-shaped in cross section, as shown most clearly in Fig. 2. By employing the dividing bars, the stalks are delivered upon inclined surfaces so that they are turned aside and will be guided directly onto the rolls so as to be very effectually engaged thereby and pass through the machine. It has been found in practice that the ears of corn snapped from the stalks frequently tend to roll down the dividing bars 7 without passing onto the husking rolls to be acted upon by the latter. To overcome this action and insure the ears being acted upon by the husking rolls and also to cause the husks to be engaged as close to the upper ends of the husking rolls as possible, we provide dividers 8 which are supported above the dividing bars 7 slightly below but near the upper ends of the husking rolls. These dividers 8 may be short lengths of tubing secured at their upper ends to hangers 9 which are loosely suspended upon a cross rod 10 secured in the sides of the frame 1. Any snapped ears which may tend to roll down the dividing bars 7 will obviously roll against the lower ends of these dividers 8 and will be turned aside by them so that they will be deflected onto the husking rolls. Should the ears of corn pass to the husking rolls at an abnormally high speed or, for any other reason, tend to accumulate at the upper ends of the rolls, the pendent dividers 8 will yield to the accumulation so that the ears of corn may pass downwardly, but inasmuch as they will still be required to pass the said elements 8, they will be deflected onto the husking rolls. While we prefer to use a tubular construction for these pendent dividers, it will be understood that any loosely mounted elements, such as a chain, having sufficient weight to maintain them normally in a perpendicular position, will serve the purpose.

In Figs. 3 to 6, we have shown the snapping rolls as having one member of each pair mounted in slidable bearings and yieldably held in working position by coiled springs. This construction permits the rolls to spread should an unusually thick stalk attempt to pass between them and is fully disclosed in Letters Patent No. 1,462,815, granted July 24, 1923, so that a detailed description thereof is unnecessary herein. It will also be noted upon reference to Fig. 3 that we have shown a driving shaft 11 equipped with a double beveled gear 12 meshing with gears 13 upon the upper ends of the inner rolls of the pairs of rolls, the rolls of the two pairs being operatively connected at their lower ends by intermeshing gears 14. This arrangement of gearing equalizes and distributes the strain upon the different members of the train of members, but it will, of course, be understood that the rolls may be driven from either their upper or their lower ends and various arrangements of gearing may be employed.

Upon reference to Figs. 3 and 5 more particularly, it will be noted that the dividing bar 6 presents a longitudinally extending edge or peak 17 at its upper end portion, and this edge or peak may be slightly rounded, or beveled, or sharpened to constitute a knife edge. When the bound bundles of stalks pass from the feeding table or conveyer 4, they fall upon this dividing bar, and as the bands binding the stalks are very taut they are easily and quickly severed when they strike the ridge or peak 17, especially as the bundles generally fall astride the bar instead of following alongside the same. The bundles are thus caused to spread so that the stalks will be evenly distributed over the rolls and will be more effectually engaged by them. It is to be noted also that by employing a plurality of pairs of snapping rolls with a dividing bar between the pairs, a larger hopper is necessarily employed and greater space is provided for the feeding of the bundles to the snapping rolls than has been heretofore obtained. In the form of the dividing bar illustrated in Figs. 3 to 7, the lower portion of the bar gradually reduces in height, as shown at 15, the result being that the side faces of the bar acquire a U-shaped formation whereby the stalks are effectually turned aside as they pass downwardly and are prevented from escaping the snapping rolls. This reduction in the height of the lower portion of the dividing bar retains all the advantages derived by spreading the stalks and at the same time permits a large space to be left between the snapping rolls and the feeding table or conveyer 4 so that the stalks and ears of corn may pass freely to the husking rolls.

Figure 7:
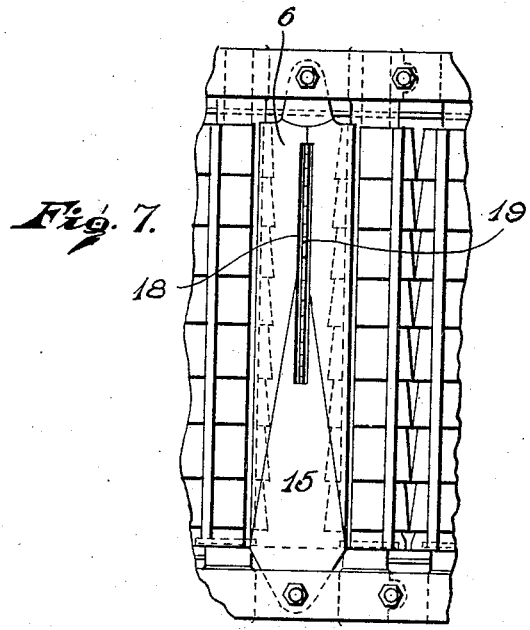
Fig. 7 is a detail plan view of the arrangement shown in Fig. 6.

Obviously the peak 17 of the dividing bar 6 may be treated to present a knife edge and, if preferred, a separate blade may be inserted in said peak so as to act upon and cut the bands. In Figs. 6 and 7, we have shown the dividing bar as provided in its upper portion with a longitudinal slot 18 and have also illustrated a large saw blade or cutter 19 secured upon the main cutter shaft 20 of the machine and projecting through the said slot so as to positively engage and sever the bands of the bundles. The slot 18, in actual practice, is made so narrow that its sides will fit closely to the sides of the saw blade but will not be in actual contact therewith, this arrangement preventing the stalks or husks being drawn into and caught in the space between the sides of the slot and the saw blade.

From the foregoing description, taken in connection with the accompanying drawings, it will be seen that we have provided simple and efficient means whereby the bundles of stalks may be fed to the snapping rolls of a corn-husking machine and distributed evenly over the same so that they may be stripped of the ears without choking the operation of the machine and the ears snapped from the stalks will be spread evenly upon the husking rolls so that they will be engaged promptly by the husking rolls and the husks stripped therefrom. While the pendent dividers are freely suspended so that they may yield to an accumulation of ears, they do not act primarily as gates to arrest the travel of the ears of corn but serve rather as deflectors to turn the descending ears onto the husking rolls so that none of the ears of corn will pass out of the machine without having been stripped of their husks. While the arrangement and construction of parts embodied in our present invention provides large capacity for the machine, the working elements are arranged compactly and are simple in construction.

Upon reference to Figs. 1, 5 and 6, it will be noted that the snapping rolls are disposed approximately upright and the divider bars are in advance of the rolls. Figs. 3 and 7 clearly show that the divider bars are secured to the yokes carrying the bearings for the snapping rolls and remain in a fixed position. Upon reference to Fig. 1, it will be understood that the bundles are presented to the dividing bars and the snapping rolls are at approximately a right angle thereto, the result being that the ends of the stalks are quickly engaged by the rolls and drawn through between them up to the point where the string is tied around the bundle. The rapid travel of the bundle brings the tied string into contact with the sharp edge on the divider bar with such force that it is instantly snapped.

Having thus described the invention, we claim:

1. In a corn-husking machine, the combination of working rolls arranged in pairs, dividing bars disposed between the pairs of rolls, and pendent deflectors freely suspended over said dividing bars.

2. In a corn-husking machine, the combination of working rolls arranged in pairs, and freely suspended deflectors arranged in front of the rolls and between the pairs thereof near the upper ends of the same.

3. In a corn-husking machine, the combination of snapping rolls arranged in pairs, a dividing bar disposed between the pairs of rolls and having diverging side members in its upper end portion, the lower end portion of the dividing bar being gradually reduced in height whereby the sides of the bar will constitute deflecting members.

4. In a corn-husking machine, the combination of rolls arrranged in pairs to snap ears of corn from cornstalks fed thereto in bundles, a dividing bar arranged longitudinally of the rolls between the pairs of rolls and having diverging side members in its upper end portion, and a rotatable cutter mounted below the dividing bar and having its working edge projecting through and above the upper portion of said bar upon a longitudinal line of the same.

In testimony whereof we affix our signatures.

THEODORE H. OPPENHEIM. [L. S.]
BERNARD SELHORST. [L. S.]